United States Patent
Inoue et al.

(10) Patent No.: US 11,203,125 B2
(45) Date of Patent: Dec. 21, 2021

(54) WIRE-BODY PROCESSING STRUCTURE FOR ROBOT

(71) Applicant: FANUC CORPORATION, Yamanashi (JP)

(72) Inventors: Toshihiko Inoue, Yamanashi (JP); Toshikatsu Kuroki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 77 days.

(21) Appl. No.: 16/775,565

(22) Filed: Jan. 29, 2020

(65) Prior Publication Data

US 2020/0298427 A1   Sep. 24, 2020

(30) Foreign Application Priority Data

Mar. 20, 2019   (JP) .............................. JP2019-052067

(51) Int. Cl.
   *B25J 19/00*   (2006.01)
   *B25J 9/00*   (2006.01)
   *B25J 9/04*   (2006.01)

(52) U.S. Cl.
   CPC ......... *B25J 19/0025* (2013.01); *B25J 9/0009* (2013.01); *B25J 9/046* (2013.01);
   (Continued)

(58) Field of Classification Search
   CPC ... B25J 9/0009; B25J 9/02; B25J 9/046; B25J 9/047; B25J 19/0025; B25J 19/0029; B25J 19/0041
   (Continued)

(56) References Cited

U.S. PATENT DOCUMENTS 6,250,174 B1   6/2001   Terada et al.
8,544,360 B2 *   10/2013   Liu ...................... B25J 19/0029
                                                74/490.02
(Continued)

FOREIGN PATENT DOCUMENTS

CA   2 657 152 A1   9/2009
EP   0 891 842 A1   1/1999
(Continued)

OTHER PUBLICATIONS

Japanese Office Action dated May 11, 2021, in connection with corresponding JP Application No. 2019-052067 (7 pp., including machine-generated English translation).

(Continued)

*Primary Examiner* — Joseph Brown
(74) *Attorney, Agent, or Firm* — Maier & Maier, PLLC

(57) ABSTRACT

A wire-body processing structure for a robot including a base, a rotary drum rotating about a first axis, and an arm rotating about a second axis. The rotary drum has a hollow part extending from inside the base, along the first axis, and opening in a top surface of the rotary drum. The wire body inside the base is led out, via the hollow part, from the opening in the top surface of the rotary drum, is bent to the rear side of the rotary drum, is guided below the arm, is fixed to the rotary drum with a first fixing member, is bent along the arm, and is fixed to a side surface of the arm with a second fixing member, with a certain surplus of a length between the first fixing member and the second fixing member.

2 Claims, 5 Drawing Sheets

(52) U.S. Cl.
CPC ........... *B25J 9/047* (2013.01); *B25J 19/0029* (2013.01); *B25J 19/0041* (2013.01)

(58) Field of Classification Search
USPC ...................................................... 74/490.02
See application file for complete search history.

(56) References Cited

U.S. PATENT DOCUMENTS

| | | | |
|---|---|---|---|
| 9,950,423 B2* | 4/2018 | Krumbacher | B25J 9/105 |
| 9,975,239 B2* | 5/2018 | Kinoshita | B25J 11/005 |
| 10,093,024 B2* | 10/2018 | Inoue | B25J 19/0025 |
| 10,119,642 B2* | 11/2018 | Girtman | B25J 19/0041 |
| 10,618,161 B2* | 4/2020 | Watanabe | B25J 9/06 |
| 2009/0224109 A1 | 9/2009 | Hasunuma et al. | |
| 2011/0314949 A1 | 12/2011 | Long | |
| 2012/0103125 A1* | 5/2012 | Liu | B25J 19/0025 74/490.02 |
| 2014/0083229 A1 | 3/2014 | Kume | |
| 2014/0103168 A1* | 4/2014 | Kume | B25J 19/0025 248/51 |
| 2015/0034698 A1* | 2/2015 | Takahashi | B25J 19/0008 228/33 |
| 2016/0256999 A1* | 9/2016 | Kinoshita | B25J 11/005 |
| 2017/0282381 A1* | 10/2017 | Inoue | B25J 19/0025 |
| 2017/0291313 A1 | 10/2017 | Inoue et al. | |
| 2018/0281174 A1* | 10/2018 | Watanabe | B25J 9/06 |
| 2018/0333844 A1* | 11/2018 | Inoue | B23K 9/12 |
| 2019/0381596 A1 | 12/2019 | Sakurai et al. | |

FOREIGN PATENT DOCUMENTS

| | | | | |
|---|---|---|---|---|
| EP | 2 479 009 | A1 | 7/2012 | |
| JP | S59-055685 | U | 4/1984 | |
| JP | H09-085670 | A | 3/1997 | |
| JP | H10-34587 | A | 2/1998 | |
| JP | H10175188 | A | 6/1998 | |
| JP | 2002-307369 | A | 10/2002 | |
| JP | 3483862 | B2 | 1/2004 | |
| JP | 2009-208194 | A | 9/2009 | |
| JP | 2011056636 | A | 3/2011 | |
| JP | 2011-161571 | A | 8/2011 | |
| JP | 2014065110 | A | 4/2014 | |
| JP | 5591894 | B2 | 9/2014 | |
| JP | 2017185597 | A | 10/2017 | |
| JP | 2018122404 | A | 8/2018 | |
| WO | WO-2018162492 | A1 * | 9/2018 | B25J 9/101 |

OTHER PUBLICATIONS

Japanese Search Report dated Apr. 21, 2021, in connection with corresponding JP Application No. 2019-052067 (14 pp., including machine-generated English translation).

* cited by examiner

WIRE-BODY PROCESSING STRUCTURE FOR ROBOT

CROSS-REFERENCE TO RELATED APPLICATIONS

This application is based on Japanese Patent Application No. 2019-052067, the contents of which are incorporated herein by reference.

FIELD

The present disclosure relates to a wire-body processing structure for a robot.

BACKGROUND

In a known wire-body processing structure, a pipe member is provided between a base and a rotary drum of a robot, along the axis of rotation of the rotary drum, and a wire body led out from inside the base to a position above the rotary drum through the interior of the pipe member is fixed to each of the base, the rotary drum, an upper arm, and a lower arm (for example, see Japanese Patent No. 5591894).

SUMMARY

The wire body in Patent Literature 1 is led out upward from the center of rotation of the rotary drum, is then bent so as to wrap around the rear side of the center of rotation of the rotary drum, is fixed to the rotary drum at a position below the first arm, is bent in a direction along the side surface of the first arm, and is fixed to the side surface of the first arm. Because the wire body is disposed so as to wrap around the rear side of the rotary drum, when the operating area of the first arm is to be increased, it is desirable to avoid interference between the first arm and the wire body.

An aspect of the present disclosure is a wire-body processing structure for a robot including a base installed on an installation surface, a rotary drum supported so as to be rotatable about a vertical first axis relative to the base, and an arm supported so as to be rotatable about a horizontal second axis relative to the rotary drum. The rotary drum has a hollow part extending from inside the base, along the first axis, and opening in a top surface of the rotary drum, and the wire body inside the base is led out, via the hollow part, upward from the opening in the top surface of the rotary drum, is bent to the rear side of the rotary drum, is guided below the arm at a height below the top surface, is fixed to the rotary drum with a first fixing member, is bent in a direction along the arm, and is fixed to a side surface of the arm with a second fixing member, with certain surplus of a length necessary for the operation of the arm between the first fixing member and the second fixing member.

DETAILED DESCRIPTION OF EMBODIMENTS

Figure 1:
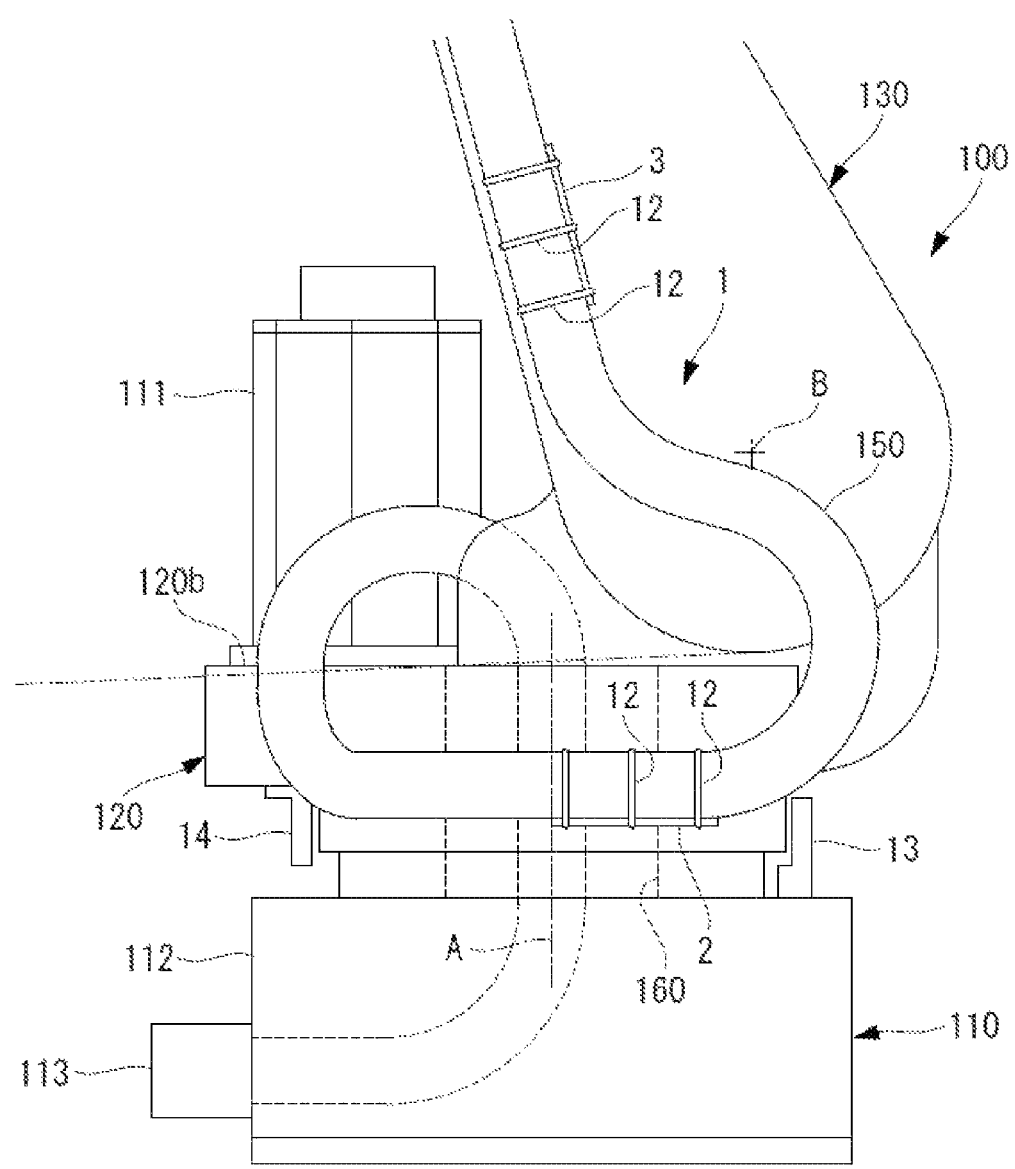
FIG. 1 is a partial side view of a robot to which a wire-body processing structure according to an embodiment of the present disclosure is applied.
Figure 2:
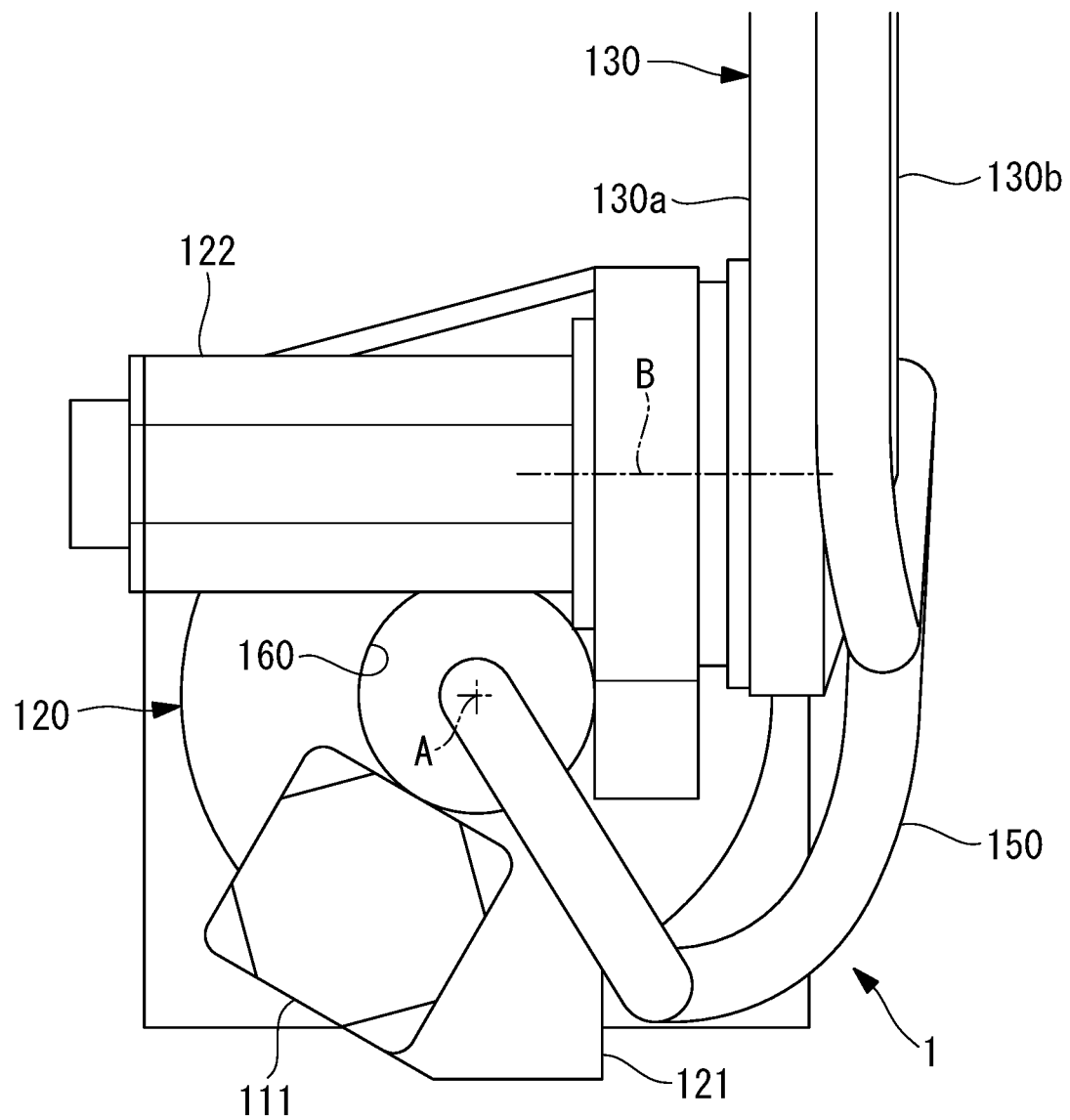
FIG. 2 is a partial plan view of the robot in FIG. 1.

A wire-body processing structure 1 for a robot 100 according to an embodiment of the present disclosure will be described below with reference to the drawings. As shown in FIGS. 1 and 2, the robot 100 to which the wire-body processing structure 1 according to this embodiment is applied includes a base 110 installed on an installation surface, and a rotary drum 120 supported so as to be rotatable about a vertical first axis A, relative to the base 110.

The robot 100 includes a first arm (arm) 130 supported so as to be rotatable about a horizontal second axis B, relative to the rotary drum 120, and an upper movable part (not shown) supported at the end of the first arm 130.

Figure 5:
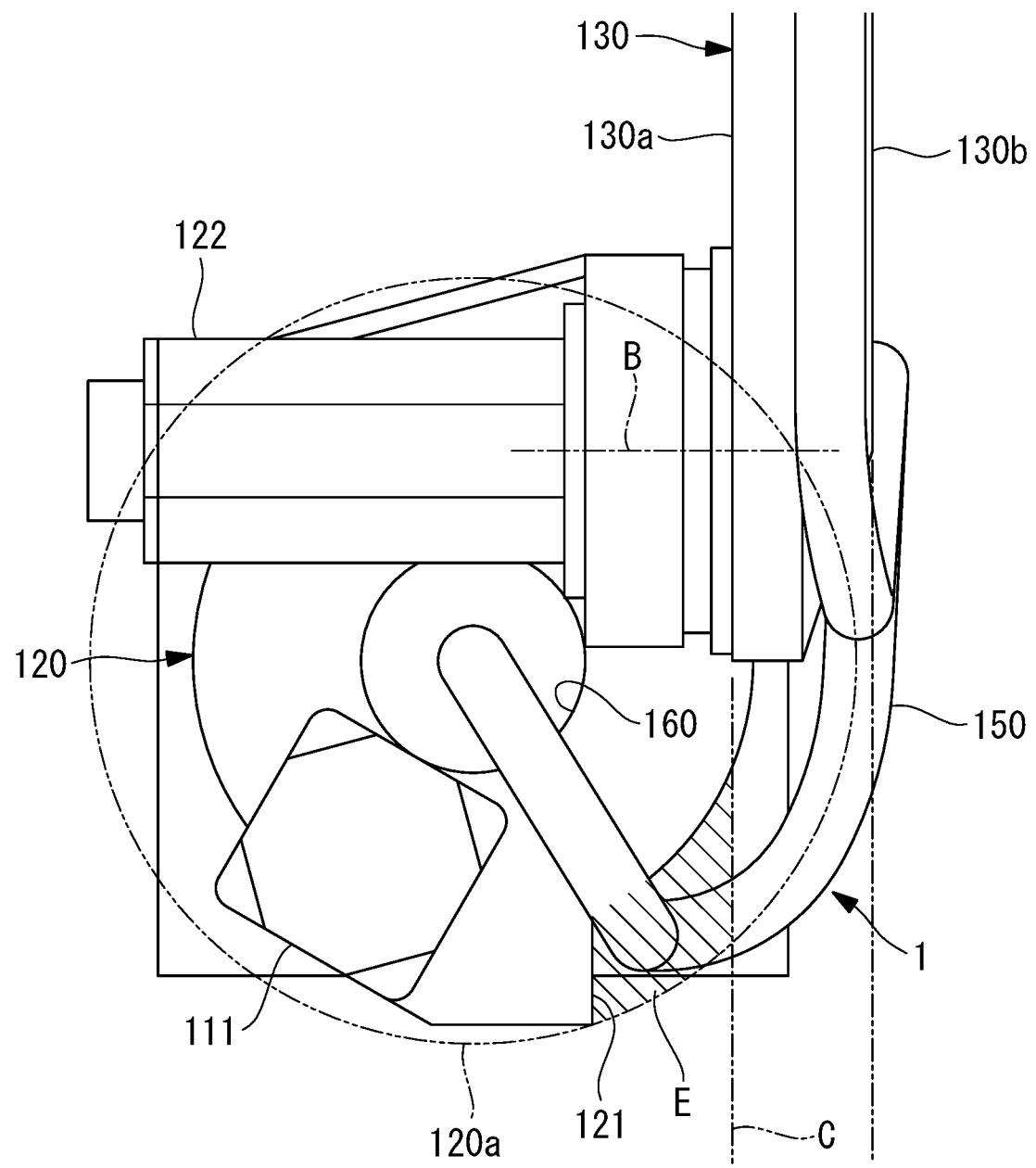
FIG. 5 is a plan view for explaining the wire-body processing structure in FIG. 1.

As shown in FIG. 2, the first arm 130 is disposed at a position offset from the first axis A of the rotary drum 120 in one direction along the second axis B. The first arm 130 has an inner surface 130a, which is closer to the first axis A, and an outer surface 130b, which is located at a position farther from the first axis A than the inner surface 130a is. As shown in FIG. 5, the inner surface 130a is disposed at a position closer to the first axis A than a circle (extreme outer edge) 120a defined by the extreme outer edge of the rotary drum 120 about the first axis A is. Thus, the first arm 130 and the rotary drum 120 are disposed in an overlapping manner in the second axis B direction.

The rotary drum 120 has a cut-away portion 121 in a shape formed by removing a portion of the rear outer edge of the rotary drum in the circumferential direction radially inward along the vertical direction. As shown in FIG. 5, the cut-away portion 121 is provided at a position straddling both sides of a plane C, along which the inner surface 130a of the first arm 130 moves. The upper movable part includes: a second arm having a longitudinal axis and supported at the end of the first arm 130 so as to be rotatable about a third axis parallel to the second axis B; and a wrist unit supported at the end of the second arm.

As shown in FIG. 1, a motor 111 that rotationally drives the rotary drum 120 relative to the base 110 is fixed to a top surface 120b of the rotary drum 120. A motor 122 that rotationally drives the first arm 130 relative to the rotary drum 120 is fixed to the rotary drum 120.

A motor that rotationally drives the second arm relative to the first arm 130 is fixed to the second arm. Three motors (not shown) that drive the wrist unit are accommodated in the second arm and a first wrist element.

The robot 100 includes base cables (wire bodies) 150 for transmitting power and control signals to the motors 111 and 122. A wire body to be attached later will also be attached to the robot 100. The wire body to be attached later is, for example, one or more cables or tubes for supplying power, control signals, compressed air, a cooling medium, or the like to a tool (not shown) attached to the end of the wrist unit and is attached to the robot 100 by a user.

The wire-body processing structure 1 according to this embodiment is a processing structure for the base cables 150 and the wire body to be attached later. Because the base cables 150 and the wire body to be attached later are processed almost in the same way, a processing structure for processing the base cables 150 will be mainly described.

As shown in FIG. 1, ends of the base cables 150 are connected to a wiring panel 112 provided on the back of the base 110 via a connector 113. The base cables 150 are guided upward from inside the base 110 through a hollow part 160 penetrating in the vertical direction near the first axis A of the base 110 and the rotary drum 120 and are led out upward from an opening of the hollow part 160 in a top surface 120b of the rotary drum 120.

Among the base cables 150, a cable to the motor 111 for driving the rotary drum 120 and a cable to the motor 122 for driving the first arm 130 relative to the rotary drum 120 diverge from the other base cables 150 and are connected to the motors 111 and 122. As shown in FIG. 1, the remaining base cables 150 led out above the rotary drum 120 are bent, from the position where they are led out above the rotary drum 120, to the rear side of the rotary drum 120 and are allowed to pass through the cut-away portion 121 provided in the rotary drum 120.

As a result, the base cables 150 are guided downward below the top surface 120b of the rotary drum 120, at the position of the cut-away portion 121. Then, the base cables 150 are bent so as to wrap around the outer side of the rotary drum 120, at a height below the top surface 120b, are guided below the first arm 130 and are fixed to the first fixing member 2 attached to the rotary drum 120.

The first fixing member 2 is fixed to the rotary drum 120 with a bolt and fixes the base cables 150 with cable ties 12 in a state in which the base cables 150 extend along the rotary drum 120. As shown in FIG. 1, the base cables 150 are bent upward in front of the first fixing member 2. As a result, the base cables 150 are guided in a direction along the first arm 130 and are fixed to the outer surface of the first arm 130 with a second fixing member 3 and the cable ties 12.

The base cables 150 are fixed to the first fixing member 2 and the second fixing member 3 so as to have a certain surplus of a length necessary for the operation of the first arm 130 between the first fixing member 2 and the second fixing member 3. The base cables 150 between the first fixing member 2 and the second fixing member 3 serve as movable cables that are deformed by the operation of the first arm 130. Because the base cables 150 in this portion are fixed with a certain surplus, sufficient durability against repeated operation of the first arm 130 is realized.

The wire body to be attached later is inserted into the base 110 from the position of the wiring panel 112 on the back of the base 110 and is disposed along the same path as the base cables 150 from inside the base 110.

As described above, with the wire-body processing structure 1 for the robot 100 according to this embodiment, the base cables 150 and the wire body to be attached later (hereinbelow, collectively and simply, a wire body 150) will be processed as follows. Specifically, the wire body 150 is led out from inside the base 110 to a position above the top surface 120b of the rotary drum 120 via the hollow part 160. Then, the wire body 150 is guided downward below the top surface 120b of the rotary drum 120 via the cut-away portion 121 provided in the rotary drum 120. Then, at a height below the top surface 120b of the rotary drum 120, the wire body 150 is led to a position below the first arm 130 and is fixed to the rotary drum 120 by the first fixing member 2.

Because the cut-away portion 121 is disposed at a position straddling both sides of the plane C, along which the inner surface 130a of the first arm 130 moves, by allowing the wire body 150 to pass through the cut-away portion 121, the wire body 150 can be guided downward below the top surface 120b of the rotary drum 120, in the area where the first arm 130 and the rotary drum 120 overlap in the second axis B direction. As a result, even when the first arm 130 is rotated to a position where it is in contact with the top surface 120b of the rotary drum 120, as shown by a two-dot chain line in FIG. 1, it is possible to prevent the first arm 130 from touching the wire body 150.

Specifically, guiding the wire body 150 downward below the top surface 120b of the rotary drum 120 provides an advantage in that it is possible to maximize the operating area for the first arm 130 while avoiding interference between the wire body 150 and the first arm 130. As shown in FIG. 5, by allowing the wire body 150 to pass through the cut-away portion 121 provided in the rotary drum 120, it is possible to minimize the amount by which the wire body 150, which traverses the rotary drum 120 in the vertical direction, projects radially outward. In FIG. 5, as shown by hatching, the wire body 150 is guided in the vertical direction in an area E inside the circle 120a defined by the extreme outer edge of the rotary drum 120.

When the wire body 150 is guided upward in the direction along the outer surface 130b of the first arm 130 from below the first arm 130, the wire body 150 can be guided upward from a position below the top surface 120b of the rotary drum 120. In other words, it is possible to ensure, in the vertical direction, a certain length of the wire body 150 serving as the movable cable and thus to reduce the load on the wire body 150, which is also advantageous.

Figure 3:
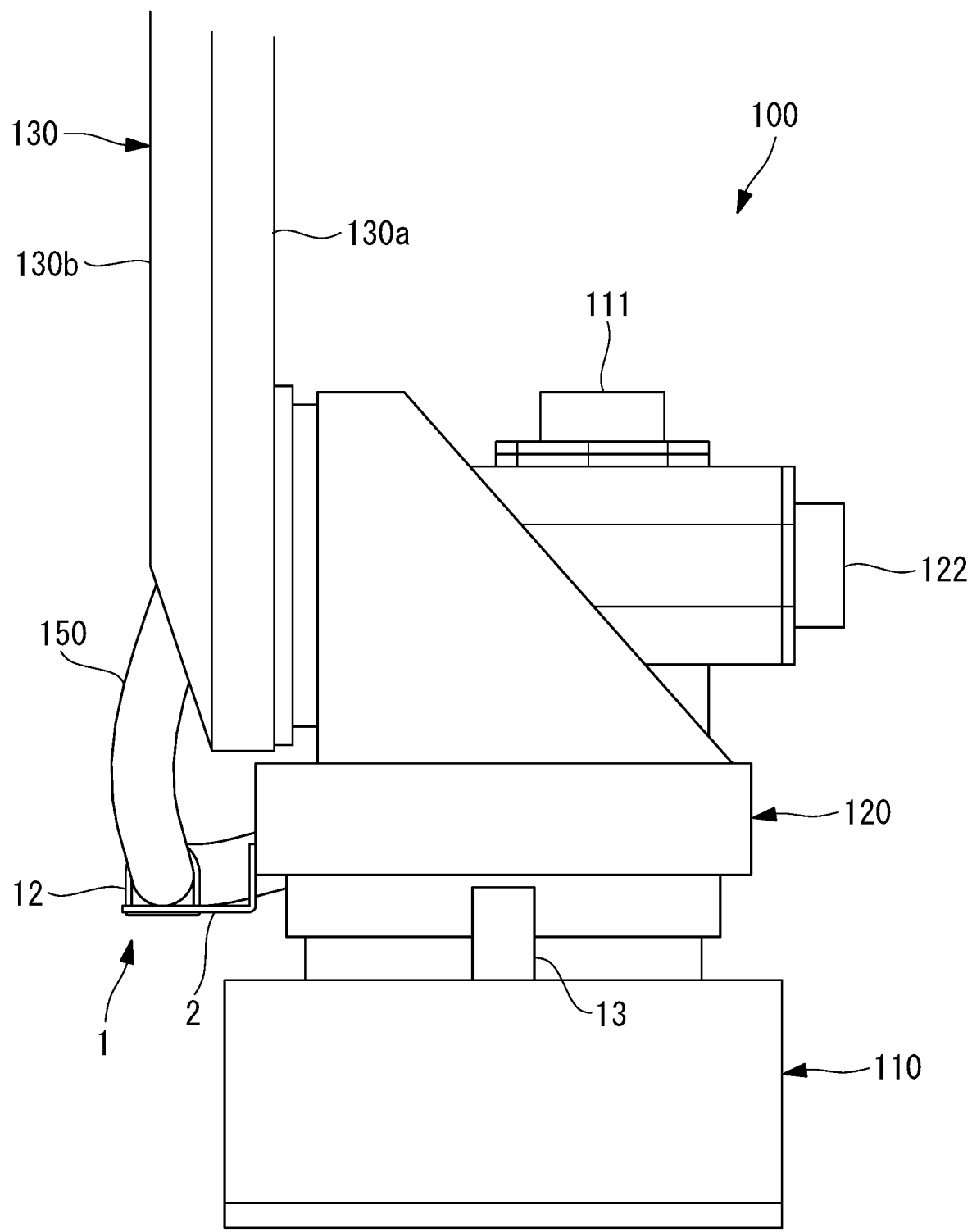
FIG. 3 is a partial front view of the robot in FIG. 1.
Figure 4:
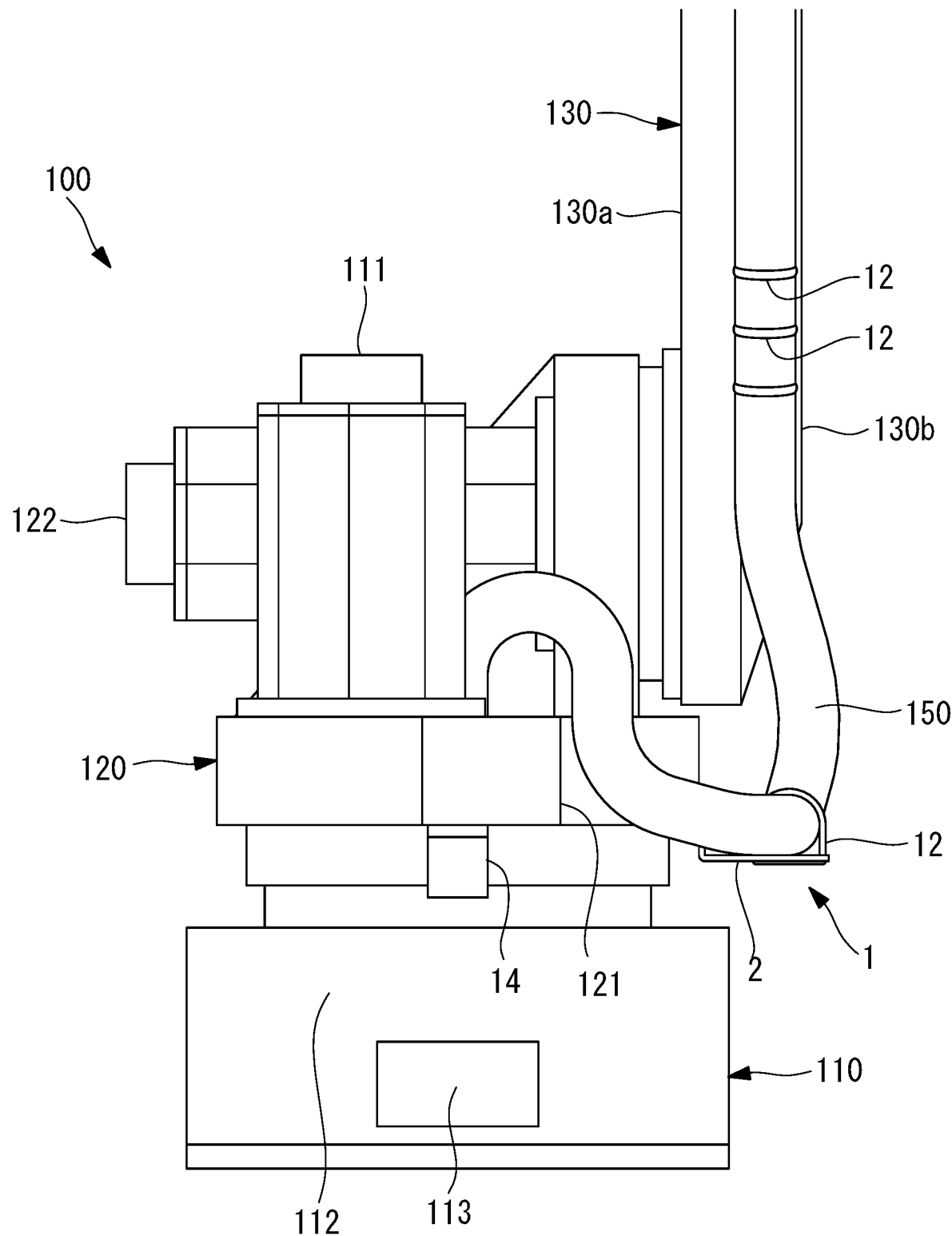
FIG. 4 is a partial back view of the robot in FIG. 1.

As shown in FIG. 1, typically, the base 110 and the rotary drum 120 have stoppers 13 and 14 that come into contact with each other at a predetermined angle of rotation of the rotary drum 120 about the first axis A, relative to the base 110. The wire body 150 cannot be disposed on the travelling path of the stopper 14 on the rotary drum 120. Hence, as shown in FIGS. 3 and 4, the portion of the wire body 150 guided downward below the top surface 120b of the rotary drum 120 is disposed on the radially outer side of the travelling path of the stopper 14. By doing so, the wire body 150 can be processed without interfering with the stoppers 13 and 14.

The invention claimed is:

1. A wire-body processing structure for a robot, comprising: a base installed on an installation surface, a rotary drum that is supported so as to be rotatable about a vertical first axis relative to the base and that includes a hollow part extending from inside the base, along the first axis, and opening in a top surface of the rotary drum, and an arm supported so as to be rotatable about a horizontal second axis relative to the rotary drum, wherein the arm and the rotary drum are disposed so as to have an overlapped area which is an area in which the arm and the rotary drum are overlapped with each other in a direction of the second axis, the rotary drum has a cut-away portion formed by cutting away a portion of an outer edge of the rotary drum in the overlapped area, and the wire body inside the base is led out, via the hollow part, upward from the opening in the top surface of the rotary drum, is bent to a rear side of the rotary drum, is guided downward, in the cut-away portion, to a position below the top surface, is guided below the arm at a height below the top surface, is fixed to the rotary drum with a first fixing member, is bent in a direction along the arm, and is fixed to a side surface of the arm with a second fixing member, with a surplus of a length necessary for an operation of the arm between the first fixing member and the second fixing member.

2. The wire-body processing structure according to claim 1, wherein the base and the rotary drum have stoppers that come into contact with each other at a predetermined angle of rotation, and the wire body is guided downward below the top surface, on an outer side of the stoppers in a radial direction about the first axis.

\* \* \* \* \*